(12) United States Patent
Lee

(10) Patent No.: US 8,514,730 B2
(45) Date of Patent: Aug. 20, 2013

(54) TELECOMMUNICATIONS ROUTING

(75) Inventor: John C Lee, Eye (GB)

(73) Assignee: British Telecommunications public limited company, London (GB)

( * ) Notice: Subject to any disclaimer, the term of this patent is extended or adjusted under 35 U.S.C. 154(b) by 121 days.

(21) Appl. No.: 12/600,395

(22) PCT Filed: Apr. 7, 2008

(86) PCT No.: PCT/GB2008/001229
§ 371 (c)(1),
(2), (4) Date: Nov. 16, 2009

(87) PCT Pub. No.: WO2008/145948
PCT Pub. Date: Dec. 4, 2008

(65) Prior Publication Data
US 2010/0150012 A1     Jun. 17, 2010

(30) Foreign Application Priority Data

May 25, 2007    (EP) ..................................... 07252168

(51) Int. Cl.
*G01R 31/08*       (2006.01)
(52) U.S. Cl.
USPC ............................ 370/252; 370/225; 370/242

(58) Field of Classification Search
None
See application file for complete search history.

(56) References Cited

U.S. PATENT DOCUMENTS

| 6,144,641 | A | 11/2000 | Kaplan et al. |
| 7,409,451 | B1 * | 8/2008 | Meenan et al. ............... 709/227 |
| 2003/0031180 | A1 | 2/2003 | Datta et al. |
| 2005/0008017 | A1 | 1/2005 | Datta et al. |
| 2005/0174935 | A1 * | 8/2005 | Segel ............................ 370/228 |

OTHER PUBLICATIONS

International Search Report for PCT/GB2008/001229, mailed May 30, 2008.

* cited by examiner

*Primary Examiner* — Kibrom T Hailu
(74) *Attorney, Agent, or Firm* — Nixon & Vanderhye P.C.

(57) ABSTRACT

A telecommunications network termination device has the capability to connect to a network access point using a primary fixed line address by a first route and also, using a second network address, by a backup routing to a shared wireless access point. Connection status messages are transmitted over the primary routing. If these are not detected by the network, it causes traffic to the user device to be diverted over the backup routing to the second network address. It also transmits instructions to the user device to route outgoing traffic by the same secondary route. The secondary route is identified from network topology data stored by the network control server.

6 Claims, 6 Drawing Sheets

TELECOMMUNICATIONS ROUTING

This application is the U.S. national phase of International Application No. PCT/GB2008/001229 filed 7 Apr. 2008, which designated the U.S. and claims priority to EP Application No. 07252168.5 filed 25 May 2007, the entire contents of each of which are hereby incorporated by reference.

BACKGROUND AND SUMMARY

This invention relates to the routing of telecommunications, and in particular to improving reliability in the connection between an end-user and the network to which the user is connected.

Telecommunications services such as voice, data, video etc may be provided to a customer by any of several different means, for example by a broadband connection to the "Internet", typically over the traditional "copper pair" fixed-line connection originally deployed for simple voice telephony, or the more recent fibre optic cable connections, or a wireless connection. Wireless communications systems are more versatile than fixed lines, in that connections can be readily reconfigured to cope with mobile users, changes in demand, or infrastructure failure. Although installation is simpler, the ongoing cost of providing a wireless system is much greater than for a fixed connection of similar capacity.

Recent trends have been to integrate many different services over a single physical connection, rather than using separate connections for each one. This method of provisioning is more cost-effective and versatile than separate provisioning for each service, but it leaves the user vulnerable to simultaneous loss of all services in the event of a failure of that connection. Large business customers can afford to provide multiple redundancy in their physical connections to ensure continuity of service, but such arrangements are too costly to be economic for smaller businesses and domestic users: Examples of such systems are discussed in Patent specifications US2005/0008017, US 2003/0031180 (both Datta et al), and U.S. Pat. No. 6,144,641 (Kaplan et al).

According to the invention, there is provided a telecommunications network having provision for communications addressed to a given network termination device to be routed to a primary network address, means for associating a secondary network address with the primary network address, monitoring means for detecting a loss of connectivity between the network and the primary network address, and means for causing the network termination device to connect with the network over a secondary routing using the secondary network address when such loss of connectivity is detected.

The invention also provides a co-operating telecommunications network termination device having user device connection means for connection to one or more computing devices, and at least two network connection means, the first network connection means having a first network address for communicating with a network by way of a primary routing, and a second network connection having means for communicating with a network using a second network address by way of a secondary routing, further comprising monitoring means for identifying a failure of communication with the network by the first connection means, and means for diverting connection to the secondary connection means using the second network address when such failure is detected.

The invention also provides a method of operating a telecommunications system in which connection between a network termination device and a network may be made by means of a primary routing having a first network address or by an alternative, secondary routing, having a second network address, between the termination device and the network, and wherein if a failure is detected in the primary routing, the termination device generates a message to the network to cause traffic to and from the termination device to be diverted over the secondary routing using the second network address.

In a typical installation the primary routing would be a dedicated fixed line connection and the secondary routing would be provided by a wireless distribution point associated with a plurality of fixed line terminations. As it is unlikely that all the fixed line connections would fail at the same time, the wireless distribution point need only have capacity to support one, or a limited number, of the primary connections.

Preferably, on initial connection being established between a network termination device and a first connection, a signal indicative of the capability of the network termination device to be connected by way of an alternative routing is transmitted over the first connection, and on receiving this signal the network control system retrieves, from an associated store of network topology data, network address data relating to at least one secondary network routing, and transmits the network address data to the user termination device. Thus the termination and the network co-operate to identify a capability to set up an alternative routing, and identify a suitable routing if this is the case.

Preferably, the telecommunications network termination device has means to generate an address update in response to instructions received from the network indicative of a failure of the first connection means. This allows transmissions to the termination to be diverted to the new network address using standard address update procedures common in mobile access systems.

Preferably, attempts are made to continue transmission of the monitoring signal over the primary routing whilst traffic is diverted over the secondary routing, and if the monitoring signal transmitted over the primary routing is again detected by the network control system, indicating that such connection has been restored, traffic is redirected over the primary network using the first network address.

The device preferably has means to monitor the secondary route to ensure that it too is working and intact. In the preferred embodiment the device generates connection integrity messages for transmission by way of the connections, and means to respond to diversion instructions received from the network in the event that the network fails to receive them.

In the embodiment to be described, the connections are of ADSL (asymmetric digital subscriber line) type, but this is not limitative of the scope of the claims.

The user device connection means may provide fixed or wireless connection to a number of individual computing devices, for example through a local access network (LAN) or a wireless local access network (WLAN).

In co-operation with such a device, the telecommunications network includes provision for arranging for communications addressed to a given user to be routed either to a fixed line termination or to a wireless distribution point associated with the fixed line termination.

Preferably the wireless distribution point is associated with a plurality of fixed line terminations. The wireless connection may therefore be available to a plurality of users, each having a similar hub device. As it is unlikely that more than one or two of the users would require this capacity at the same time; the wireless distribution point can act as a reserve link for many such terminations, making the provision of a large capacity reserve link viable. This allows the cost of provisioning the required capacity to be shared between several users, offering some economies. Consequently, several businesses on neighbouring sites, for example in a business park, may share the use of the distribution point. Each user would have a primary broadband connection via the normal copper pair delivery network, and a secondary broadband route via a wireless connection between the hub device and the shared wireless distribution point serving the business site.

The hub device has means to redirect the wireless and physical LAN traffic over the secondary route until the primary route is repaired. When a failure of the primary route is detected, the user can be reconnected onto the shared wireless route to provide a connection whilst repair of the primary route is carried out. The network has means for detecting traffic received from users by way of the distribution point, and means for redirecting traffic destined for that user so that it is routed by way of the wireless connection.

BRIEF DESCRIPTION OF THE DRAWINGS

An embodiment of the invention will now be described, by way of example, with reference to the drawings, in which.

DETAILED DESCRIPTION OF PRESENT EXAMPLE EMBODIMENTS

Figure 1:
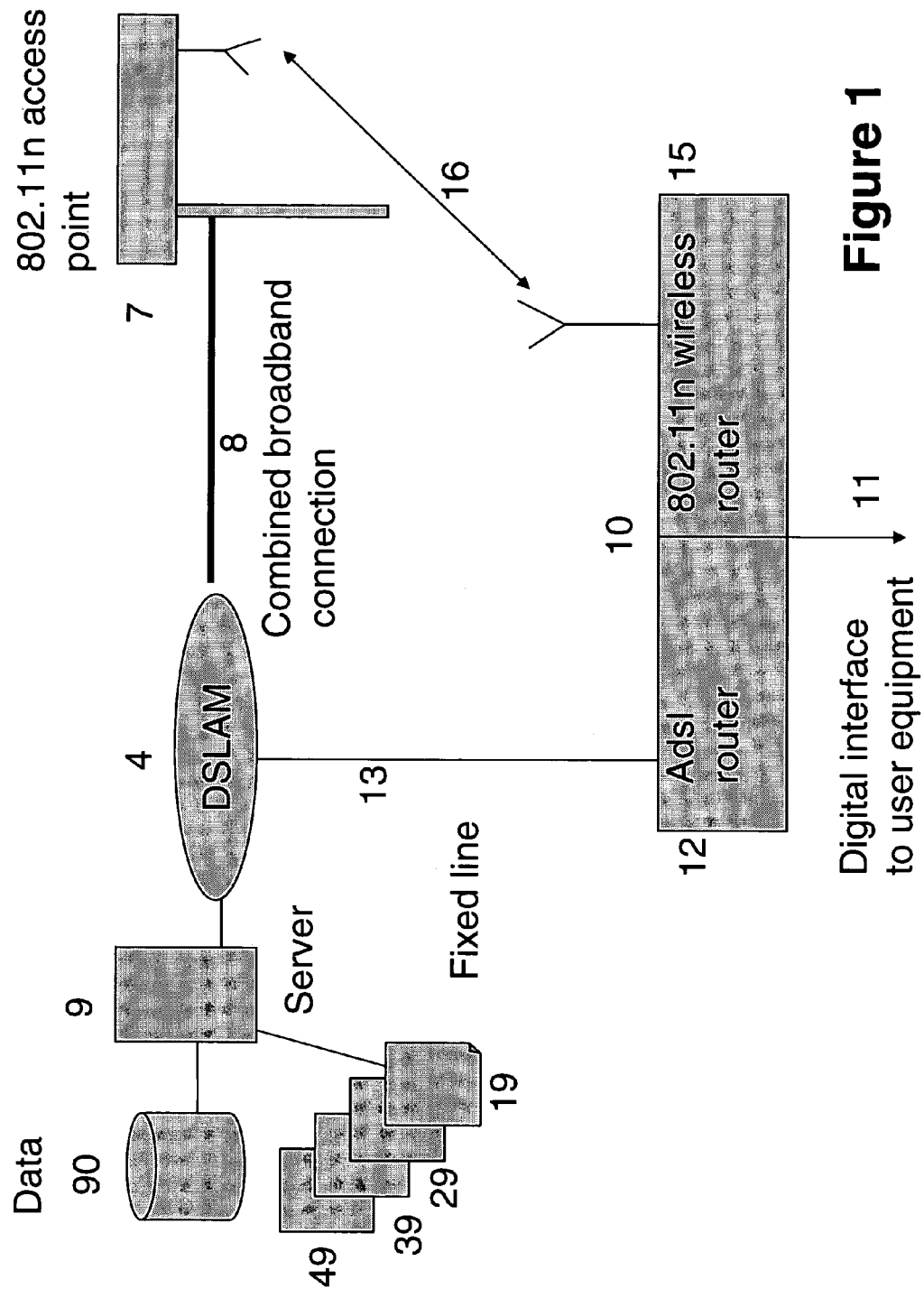
FIG. 1 is a schematic illustration of the devices which co-operate to perform the method of the invention

FIG. 1 shows a network termination equipment 10 (hereinafter referred to as a "hub") capable of connection to one or more user devices, such as computers, over a digital interface 11 (wired or wireless). The hub 10 has a first connection 12 to an active broadband circuit 13 connected to a DSLAM (Digital Subscriber Line Access Multiplexer) 4, and a concurrent standby circuit 15 that is made over a radio link 16 to a local distribution point 7, such as an access point mounted on the top of a roadside pole. The access point is connected back to the DSLAM 4, via a dedicated fixed or radio circuit 8.

Figure 2:
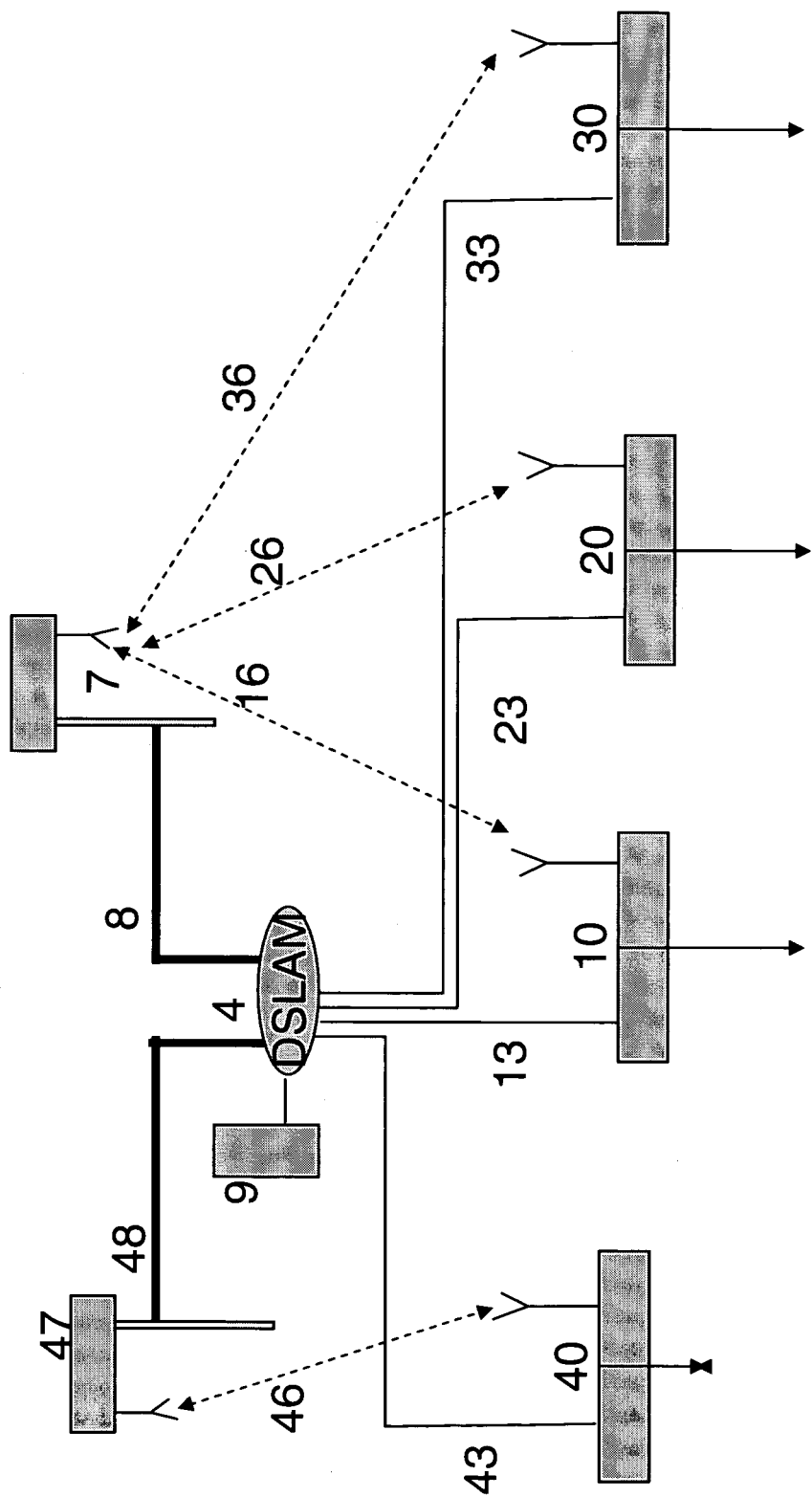
FIG. 2 is a schematic illustration of an installation including several user terminations making use of a shared connection

FIG. 2 shows the user device 10, together with a number of similar devices 20, 30, 40 each having a respective primary connection 13, 23, 33, 43 to the DSLAM 4. Each one is also capable of establishing wireless connection 16, 26, 36 with a distribution point 7. As shown in FIG. 2, more than one such distribution point 7, 47 may be needed to provide wireless coverage for all the user hubs 10, 20, 30, 40 served by one DSLAM 4.

The distribution point 7 does not need to have sufficient capacity to handle all its associated user terminals 10, 20, 30 at once—it is there to cover individual outages and therefore only needs to handle the equivalent of one or two customers' traffic at any one time. It may be arranged so that any spare capacity that is currently available may be used as a wireless "hot spot" by itinerant wireless users, at least when not required for network resilience purposes.

The customer's hub 10 normally uses the broadband link 13 to connect to the internet/ISP, and periodically transmits "alive-and-well" messages via the wireless connection 16 from the wireless access circuit 15 to the wireless distribution point 7 at the pole top.

The user's terminal is connected to the hub 10 by means of a digital connection 11. The hub routes this connection to either the primary ADSL connection 13 or, on failure of this, to the wireless connection 16. The hub 10 monitors correct function of both the broadband link 13 and the standby connection 16. If the broadband link 13 fails, it tests the standby connectivity 16, 8 and, if it is found to be usable, the user's broadband connection is passed to the wireless access function 15 in the hub. The wireless function 15 allows data to pass through to the wireless access point 7, and then to the DSLAM 4, causing the DSLAM to put into action the reserve broadband connection 16 as will be described with reference to FIG. 5. This connection is used until the copper based primary ADSL connection 13 is restored.

As far as the rest of the network is concerned, the ADSL router 12 and 802.11 wireless router 15 are unrelated terminations, each having their own IP address. Data addressed to the ADSL router 12 has to be diverted by the network, specifically the DSLAM 4, to reach the customer 10 via the wireless connection 16. In order to set up the alternative route, the network, specifically the DSLAM 4, needs to be configured to associate the two routings 13; 8-16, and to set up the appropriate wireless route 8. This network control function is performed by a server 9 associated with the DSLAM 4, in co-operation with the user terminal 10.

The operation of the invention will now be described in more detail, with reference to FIGS. 3, 4, 5 and 6.

Figure 3:
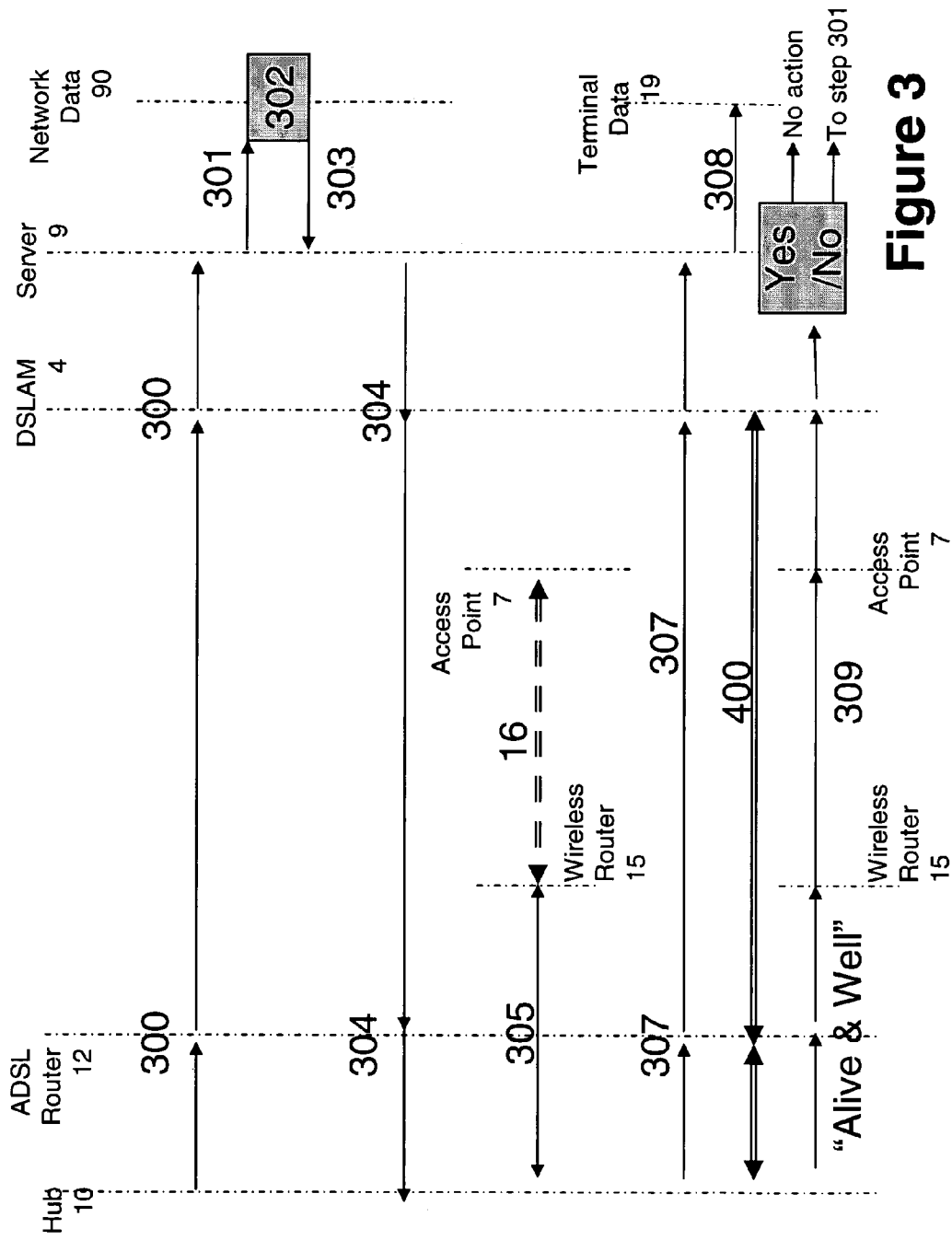
FIG. 3 is a flow diagram illustrating a first process for identifying the primary and secondary connections when a hub is first connected to the networks

As shown in FIG. 3, when contact is first established between the hub 10 and the DSLAM 4 (step 300), the server 9 determines the geographical location of the network termination 12. This may be accessed from a database 90 relating the topology of the fixed network to geographical location, and in particular to the locations of distribution points 7, 47 etc. This process requires co-operation between the hub 10 and the network server 9 associated with the DSLAM 4 because the network topology is known to the DSLAM, but the dual routing capability is a property of the hub 10. The process may be initiated by either the hub 10 or the server 9.

In a preferred arrangement, the hub 10, on connection to a DSLAM 4, transmits a message 300 identifying itself as being configured for the dual routing capability. If the DSLAM has the facility for dual routing, the associated server 9 responds by accessing a database 90 to retrieve the network location of the network termination 12 through which the hub has contacted the DSLAM 4 (step 301). The database 90 identifies a distribution point 7 that is expected to be within wireless range of the location of the network termination 12 and capable of providing the required backup service (step 302), and returns the identity of this distribution point 7 to the server 9 (step 303). Set-up instructions are then downloaded by the server 9.

The download instructions may be transmitted to the hub 10 over the already-established primary connection 13 (step 304). The hub 10 then attempts to establish a wireless link 16 between its wireless router 15 and the selected wireless distribution point 7 (step 305). The system may be configured to attempt connection between the hub 10 and more than one such distribution point 7, 47, selecting the best, or the first, to succeed.

Figure 4:
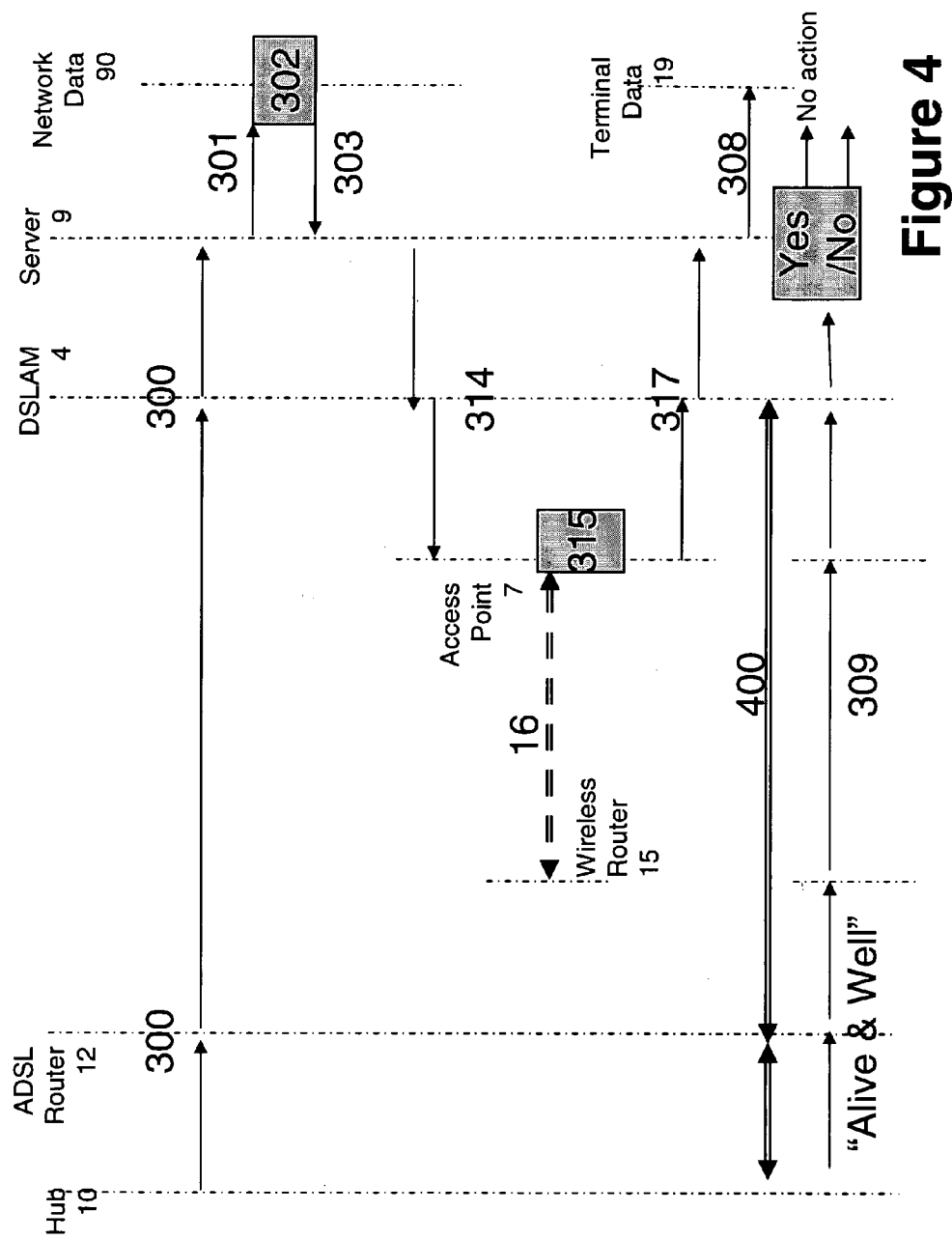
FIG. 4 is a flow diagram illustrating an alternative process for identifying the primary and secondary connections when a hub is first connected to the networks

In an alternative process shown in FIG. 4, the download instructions may be sent over the connection 8 to the selected wireless distribution point 7 (step 314), which initiates an attempt to establish a wireless link 16 with the wireless router 15 in the hub 10 (step 315). (Again, in this variant, connection may be attempted by more than one wireless distribution point), In either case, a successful connection 16 is reported back to the server 9 (step 307, 317), over one of the two routings now available—not necessarily the one over which the download instructions were transmitted.

Once a suitable link 7 is identified, data relating to it is then stored by the DSLAM server 9 in a store 19 associated with the network termination 12 (step 308), and also by the hub 10, in order to allow connection to be made in case of failure of the main link 13. Each network termination 10, 20, 30, 40 for which such an association has been made has the identity of the backup routing (8-7-16-15; 8-7-26-25; 8-7-36-35; 48-47-46-45 respectively) stored in a respective store 19, 29, 39, 49 associated with the server 9.

Figure 5:
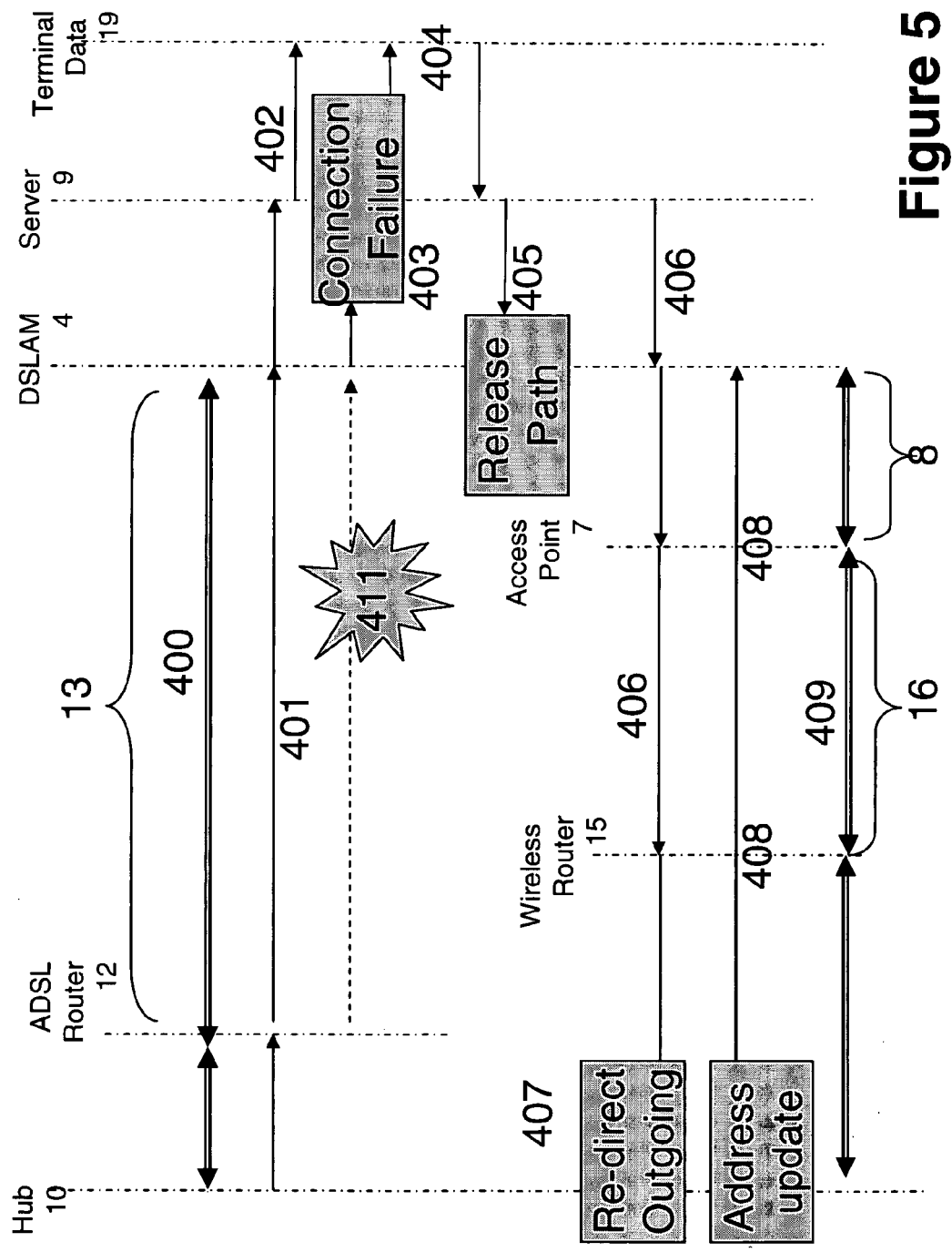
FIG. 5 is a flow diagram illustrating the process of diversion of traffic from a routing by way of a primary connection to a routing by way of the secondary connection, on detection of a failure of the primary connection
Figure 6:
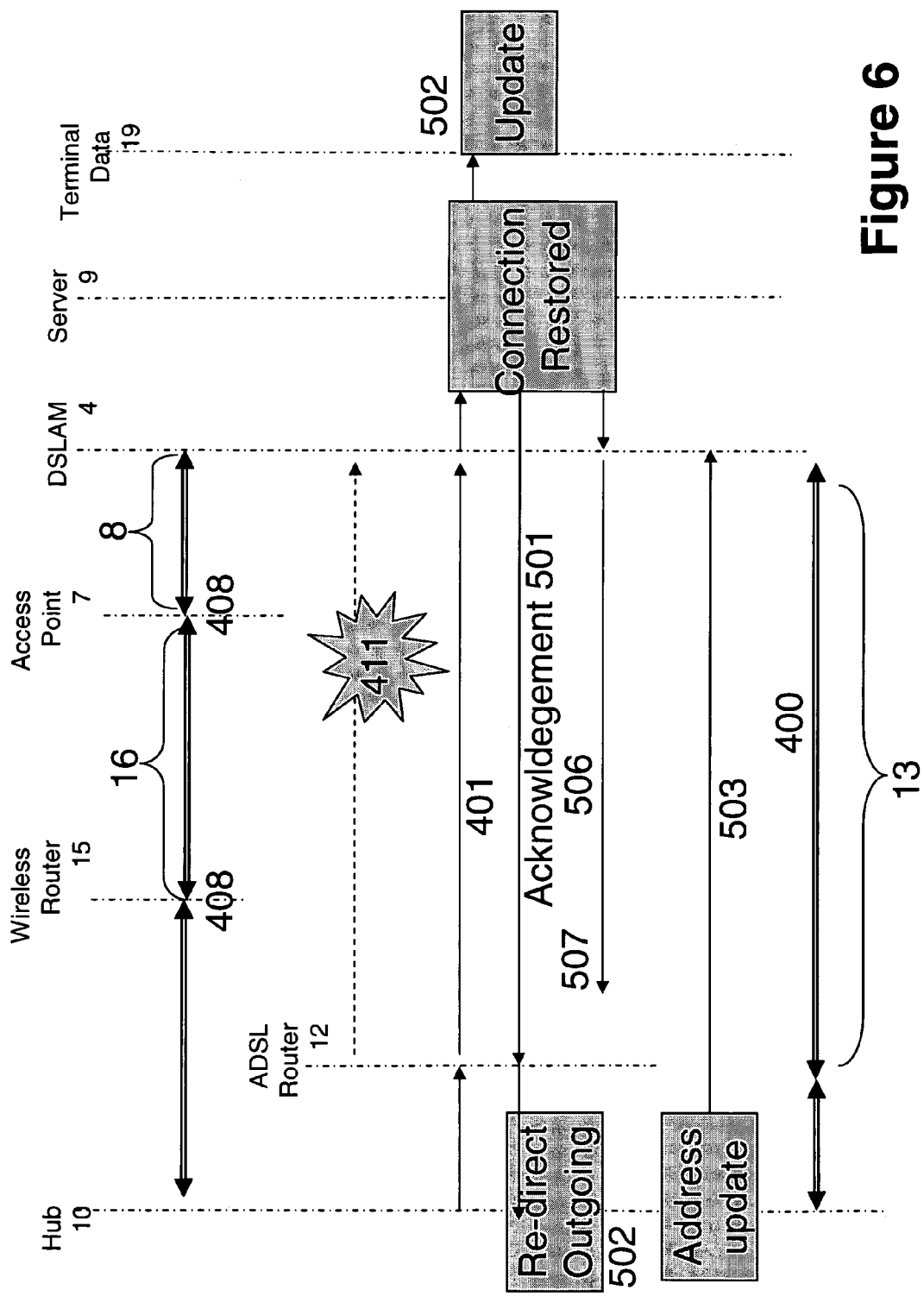
FIG. 6 is a flow diagram illustrating the process of redirection of traffic from a routing by way of the secondary connection to resume a routing by way of the primary connection on detection of repair of the primary connection

As shown in FIG. 5, during normal operation, traffic 400 is carried over the fixed line connection 13. Periodically, without interruption to the main user link 13, the hub transmits "alive-and-well" messages 309 over the wireless connection 16 to ensure that the reserve connection will be available if required. The hub may also perform tests to ensure that the performance of the wireless connection is adequate for use as a standby circuit. This acceptable performance level may be less than that available over the main link. The actual performance of the link may vary over time depending on contention levels with other users. In the event of a loss or deterioration of the wireless connection, the procedure described above with reference to FIG. 3 is resumed in order to identify a new backup routing.

The hub 10 also periodically generates an "alive-and-well" message 401 for transmission over the fixed link 13, similar to the message 309 transmitted over the wireless link. The network-embedded server 9 receives these "alive-and-well" messages and uses them to maintain the record 19 associated with the circuit 13 (step 402).

Should the network server 9 fail to detect this message 401, indicating a failure 411 on the primary connection 13 (step 403), it retrieves data relating to the second path 8 from the database 19 (step 404), and is updated to release the primary path 13 (step 405) and transmit instructions (406) for the hub 10 to perform an address update (407) using the IP address of the secondary circuit 15. The hub now transmits its new IP address back to the DSLAM 4(step 408) over the secondary circuit to allow its network address to be updated. Thus all future information 409 generated by or for the user terminal 10 will be transmitted over the second path 8, 16 via the access point 7.

Whilst the backup routing 16 is in use, the user hub 10 continues to attempt to transmit "alive-and-well" messages 401 over the primary path 13, and the server 9 continues to monitor the DSLAM 4 to determine whether these messages are being received, indicating that the link has been restored. On receipt of such a message 401, the server transmits an acknowledgement 501, causing the hub 10 to redirect outgoing traffic to the ADSL router 12 (step 502) and to generate an "address update" message 503 to revert to the primary link address, thereby restoring service onto the primary route 13 and releasing and re-establishing the IP address used by the user's hub 10.

"Alive-and-well" error messages may also be generated by the server for detection at the hub, so that it can initiate the transitions between the primary and secondary routings. A degradation, of either the alive-and-well message or the complete data transfer, less than complete loss of connection, may be alerted to the user so that the resilience option may be invoked proactively.

In a preferred embodiment the secondary path 8 is able to be shared between several users' termination points. This requires the network server 9 to be able to support several user accounts and to poll, in turn, each hub 10 associated with an account and IP address. If any hub detects a primary link failure, then it would report this as part of its alive-and-well message, and initiate connection on the wireless path. In the event of contention, allocation may be on a first-come-first-served basis, allocating bandwidth only to the first user, or the first few users, until all the available bandwidth is in use. Alternatively, at times of high contention, the wireless connection 8 may be delivered at a slower rate than for the primary service 13, allowing several virtual services to be provided at any time.

The pole top access point 7 may be dedicated to a restricted set of user hubs, specifically to provide the service resilience, or it may be a part of a public access network, the user hub terminal 10 being allocated both a fixed-line broadband account on the ADSL router side 13 and a wireless access account for use on the wireless router side 16. Software in the hub 10 would firstly detect a failed fixed link 13 and would then look for an alternative path by setting up a transmission path across the wireless link 16 to the pole top access point 7, using inbuilt account information. The IP address would then be released at the server 9 and restored via the wireless link 8, 13. The broadband connection can therefore be restored, either at the best available rate or at the full rate, to any user in range of the public access point. Special billing arrangements may be made so that the user only pays for the wireless account when it is being used, or it is paid for by the provider of the fixed service—the resilience attracting a higher premium to cover the contingency cost of the reserve link being used. On restoration of the link 13 the hub would detect the restored connection, would close down the wireless connection, and restore service to the primary route. The IP address would then be released and restored to the primary link.

The invention claimed is:

1. A telecommunications network comprising:
   one or more network termination devices, provision for communications addressed to the or each network termination device to be routed to a respective primary network address,
   data storage memory for recording network topology information,
   a unit responsive to initial detection of connection of the given network termination device to the network via the primary network address, so as to determine, from the primary network address and the network topology information stored in the data storage memory, a second network address to which the network termination device may be connected,
   a unit configured to associate the secondary network address with the primary network address,
   a unit configured to transmit to the given network termination device instructions to establish a routing to said second address,
   the or each network termination device having a respective monitoring unit configured to detect the state of connectivity between the device and the primary network address, and
   a unit configured to cause a given network termination device to connect with the network over a secondary routing using the secondary network address when such loss of connectivity is detected.

2. The telecommunications network according to claim 1, wherein the secondary routing is provided by a wireless distribution point associated with a plurality of fixed line terminations.

3. A telecommunications network termination device comprising:
- a user device connection unit configured to connect to one or more computing devices, and
- at least two network connection units, the first network connection unit having a first network address for communicating with a network by way of a primary routing, and the second network connection unit configured to communicate with a network using a second network address by way of a secondary routing,
- the second network connection unit being configured to generate a signal on initial connection to a network by the primary routing, indicative of an ability to connect the network termination device by way of the secondary routing in the event of failure of the primary routing, and
- a unit configured to receive data from the network to identify the second network address to be used when the secondary routing is to be used,
- the first network connection unit being configured to monitor the connection and to identify a failure of communication with the network by the first network connection unit, and configured such that, when such failure is detected, connection is diverted to the secondary network connection unit using the second network address identified on initial connection.

4. The telecommunications network termination device according to claim 3, having a unit configured to generate an address update in response to instructions received from the network indicative of a failure of the first connection unit.

5. A method of operating a telecommunications system in which connection between a network termination device and a network may be made by use of a primary routing having a first network address or by an alternative, secondary routing, having a second network address, between the termination device and the network, wherein on initial connection being established between a network termination device and the primary routing, a signal indicative of its capability of connection by way of a secondary routing is transmitted over primary routing, and on receiving this signal the network control system retrieves, from an associated store of network topology data, network address data relating to at least one secondary network routing, and transmits the network address data to the user termination device, and wherein if the network termination device detects a failure in the primary routing, the termination device generates a message to a network control system to cause traffic to and from the termination device to be diverted over the secondary routing using the second network address.

6. A method according to claim 5, wherein attempts are made to continue transmission of the monitoring signal over the primary routing whilst traffic is diverted over the secondary routing, and if the monitoring signal transmitted over the primary routing is again detected by the network control system, indicating that such connection has been restored, traffic is redirected over the primary network using the first network address.

* * * * *

UNITED STATES PATENT AND TRADEMARK OFFICE
CERTIFICATE OF CORRECTION

PATENT NO. : 8,514,730 B2  Page 1 of 1
APPLICATION NO. : 12/600395
DATED : August 20, 2013
INVENTOR(S) : John C Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 125 days.

Signed and Sealed this
Fifteenth Day of September, 2015

Michelle K. Lee
*Director of the United States Patent and Trademark Office*